G. H. THOMAS.
ENGINE STARTER.
APPLICATION FILED APR. 27, 1914.
1,118,598.
Patented Nov. 24, 1914.
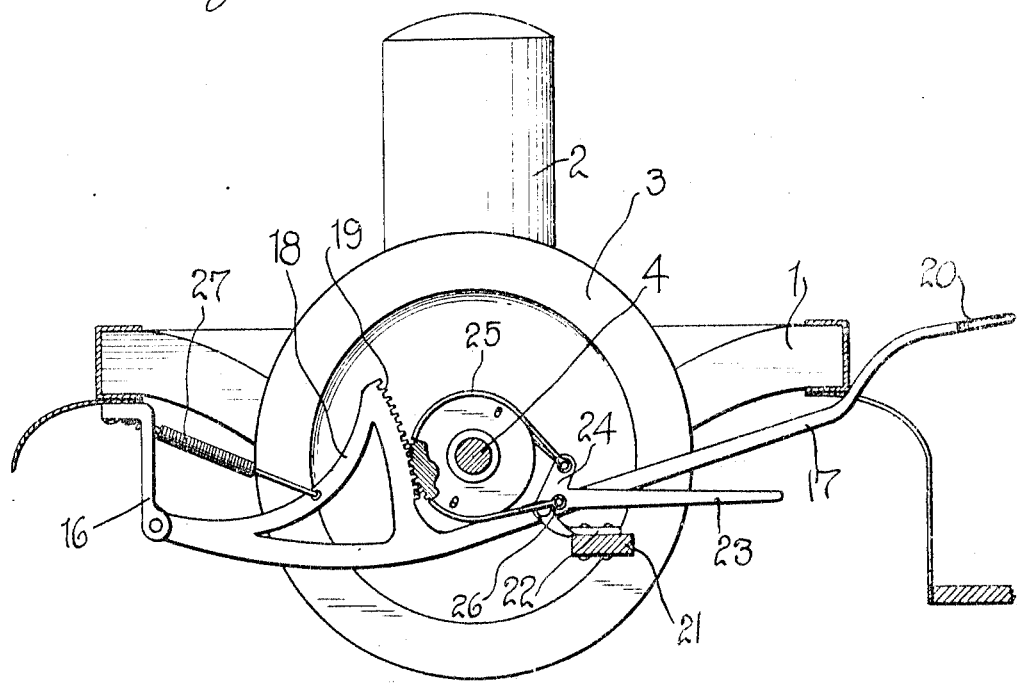
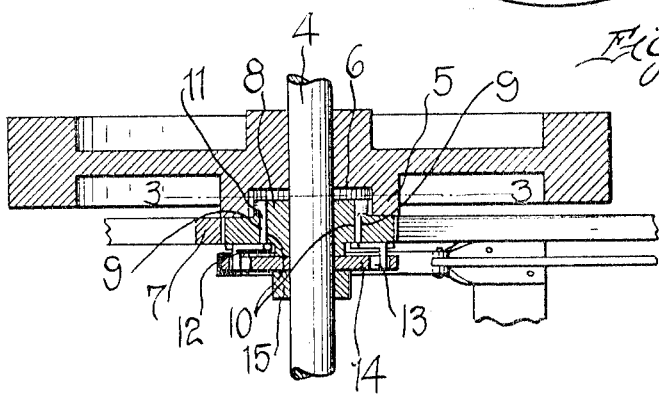
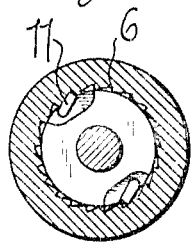
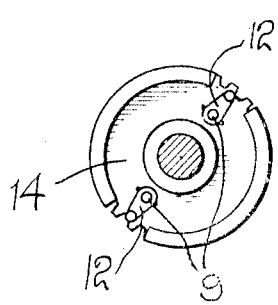
Inventor
G. H. THOMAS
By Watson E. Coleman
Attorney
Witnesses
Robert M. Sutphen
A. L. Hird

UNITED STATES PATENT OFFICE.

GEORGE HARRISON THOMAS, OF MINERAL RIDGE, OHIO.

ENGINE-STARTER.

1,118,598.  Specification of Letters Patent.  Patented Nov. 24, 1914.

Application filed April 27, 1914.  Serial No. 834,857.

*To all whom it may concern:*

Be it known that I, GEORGE HARRISON THOMAS, a citizen of the United States, residing at Mineral Ridge, in the county of Trumbull and State of Ohio, have invented certain new and useful Improvements in Engine-Starters, of which the following is a specification, reference being had to the accompanying drawings.

This invention relates to new and useful improvements in engine starters and more particularly to a foot starting mechanism for automobile engines or the like and it has special relation to an improved starting mechanism which is designed to be operated by the foot and which is especially applicable in its adaptability of operation to automobile engines and analogous uses.

The main object of the present invention is the provision of a simple and improved starting mechanism for automobile engines which can be conveniently and effectively operated by the driver or operator upon entering the vehicle and which will be positive and safe and efficient in its operation.

Another object of the present invention is the provision of a device of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawing forming a part of this application, Figure 1 is a rear elevation of an automobile engine illustrating the application of my improved starting device, parts thereof being broken away and illustrated in cross section. Fig. 2 is a horizontal sectional view through the starting mechanism. Fig. 3 is a transverse sectional view taken on the line 3—3, Fig. 2; and Fig. 4 is an elevation of the brake collar.

Referring more particularly to the drawing, 1 indicates the chassis of a vehicle, upon which the engine 2 is mounted and is provided with the usual fly wheel 3 and the drive shaft 4. The fly wheel 3 is provided at a central point with a collar 5 which is provided upon its interior with a plurality of teeth 6, the purpose of which will be hereinafter more fully set forth. Loosely mounted upon the shaft 4, is a gear wheel 7 which is provided upon one face thereof with an outwardly projecting central portion 8, said gear wheel being provided with transverse openings 9 in which are mounted the rotatable rods 10 having formed upon the inner ends thereof angularly projecting pawls 11 which are adapted to engage within the teeth 6 to rotate the fly wheel 3, upon rotary movement of the gear 7 in one direction.

Secured to the outer ends of the rods 10, are the crank arms 12, the outer ends of which are disposed within suitable slots 13 formed within the circular plate 14 which is mounted upon the shaft 4 on the outer side of the gear wheel 7, said plate being securely held in position by means of a collar 15 which is mounted upon the shaft and may be fixed thereto in any suitable manner. Suspended from one side of the forward end of the chassis, is a bracket 16 to the lower end of which is pivotally connected an operating lever 17. Formed upon the upper face of the lever 17, is an angular bracket 18, the vertical portion of which is slightly curved and provided upon its outer face with a plurality of teeth 19 which are adapted to engage with the toothed gear 7 to rotate the same upon the downward movement of the outer end of the lever 17. The free end of the lever 17 extends outwardly at one side of the vehicle and is preferably disposed directly above the running board, as illustrated in Fig. 1, so that the operator upon entering the vehicle may step upon the foot piece 20 and press the outer end of the lever downwardly to rotate the gear 7.

Extending downwardly toward the engine, from the body of the vehicle, is a supporting member 21, to which is secured a plate 22, the outer end of which is bent upon itself to form a channel in which is pivotally mounted the inner end of a lever 23, said lever having an outwardly projecting ear 24 formed upon its inner end and connected thereto, is one end of a brake band 25, said brake band passing around the plate 14 and having its other end secured to the lever 23, by means of the transverse pin 26. It will be understood that the weight of the lever 23 will be sufficient to normally maintain the band 25 into frictional engagement with the periphery of the plate 14 and in view of the fact that the gear 7 and the plate 14 are connected through the medium of the angular arms 12 and rods 10, a sufficient amount of rocking movement will be imparted to the rods upon rotary movement of the gear wheel 7, as to engage the pawls 11 with the teeth 6 and rotate the fly wheel 3, in order to start the engine.

One portion of the bracket 18 is connected to the bracket 16, through the medium of a coil spring 27, whereby after the fly wheel has been rotated and the outer end of the lever 17 released, said lever will be returned to its normal or operative position.

From the above description, taken in connection with the accompanying drawing, it will be readily seen that I have provided a simple and durable starting mechanism for internal combustion engines of various characters and particularly that type which is used upon motor vehicles.

The operation of my improved starting mechanism, will be apparent as follows:— The operator will first prime the engine then by stepping upon the foot treadle 20, upon entering the vehicle, the lever 17 will be pushed downwardly, rotating the gear 7 which, upon its rotary movement, will move the plate 14 to an extent of actuating the arms 12 which, in turn, will engage the pawls 11 with the teeth 6 and rotate the fly wheel 3 which is fixed to the main shaft 4 of the engine. It will be apparent should the engine back fire, the rotary movement of the plate 14 will be retarded by means of the binding action of the brake band, thus allowing the gear 7 to rotate backward which in turn will rock the pawls 11 out of engagement with the teeth 6 of the wheel 3. It will be understood that the brake band 25 will engage the periphery of the plate 14 sufficiently so that this plate will be rotated to a certain extent upon the rotary movement of the gear 7, so as to rock the arms 12 and engage the pawls 11 with the teeth 6.

It will be apparent from the above that I have provided a simple and durable device of the character described, whereby an automobile engine may be quickly and readily started by the operator upon entering the vehicle. It will also be apparent that my improved starting device is extremely simple in construction and can be readily applied to various well known makes of motor vehicles. The device itself is one which is simple and durable in construction and can be manufactured and placed upon the market at a comparatively low cost.

While I have shown and described the preferred form of my invention, it will be obvious that various changes in the details of construction and in the proportions may be resorted to for successively carrying my invention into practice, without departing from the scope of the appended claims or sacrificing any of the principles of the invention.

Having thus described this invention, what I claim is:—

1. A device of the class described including a drive shaft, a fly wheel mounted thereon having a collar formed integral therewith, teeth formed upon the interior of said collar, a gear wheel, rods extending transversely therethrough and mounted for rocking movement, pawls formed upon the inner ends of said rods adapted to engage the teeth within the collar, means for rotating said gear, and means coacting with said gear for imparting rocking movement to said rods and engaging the pawls with the teeth in the collar to rotate said shaft in one direction.

2. A device of the class described including a drive shaft, a fly wheel mounted thereon, and a collar formed on the fly wheel having teeth formed upon the interior thereof, a gear mounted upon said shaft, rocking pawls carried by said gear, crank arms connected with said pawls, a circular plate loosely mounted on the shaft and having openings therein to receive one end of each of the crank arms, a friction brake band embracing the plate and means for imparting rotary movement to said gear, whereby rocking movement will be imparted to the pawls through their connection with the plate to engage the same with the teeth upon the interior of the collar and rotate the drive wheel in one direction.

3. A device of the class described including a drive shaft, a fly wheel mounted thereon, and a collar formed on the fly wheel having teeth formed upon the interior thereof, a gear mounted upon said shaft, rocking pawls carried by said gear, crank arms connected with said pawls, a circular plate mounted on the shaft and having transverse openings therein, a pivoted actuated lever having a toothed bracket adapted to engage with the gear wheel whereby upon the downward movement of one end of the lever, said gear will be rotated in one direction, a friction brake band embracing the plate, the outer ends of the cranks extending through the openings in the circular plate whereby to impart a slight rotary movement to the same, and rock the pawls to engage the same with the teeth upon the interior of the collar and rotate said shaft.

4. A device of the class described including a drive shaft, a fly wheel mounted thereon, a collar formed on the fly wheel having teeth formed upon the interior thereof, a gear mounted upon the shaft, a circular plate also mounted on the shaft, and means carried by the gear having connection with the circular plate and adapted for engagement with the teeth upon the interior of the collar, to rotate the fly wheel in one direction, and means for rotating the gear.

5. A device of the class described including a drive shaft, a fly wheel mounted thereon, a collar formed on the fly wheel having teeth formed upon the interior thereof, a gear mounted on the shaft, a circular plate also mounted on the shaft, means carried by the gear having connection with the circular plate and adapted for engagement with the teeth upon the interior of the collar to rotate the fly wheel in one direction, a supporting bracket mounted on the chassis of a vehicle, a lever pivotally connected to the bracket, an angular bracket formed on the lever and provided upon its outer face with a plurality of teeth, said teeth being adapted for engagement with the gear to rotate the same, and a coil spring having one end connected to the angular bracket and the other end connected to the supporting bracket to normally retain the lever in an operative position.

In testimony whereof I hereunto affix my signature in the presence of two witnesses.

GEORGE HARRISON THOMAS.

Witnesses:
 ROY ABLETT,
 W. J. SHIVELY.